(12) United States Patent
Klinedinst et al.

(10) Patent No.: US 7,611,657 B2
(45) Date of Patent: Nov. 3, 2009

(54) MOLD CLAMP ASSEMBLY FOR BLOW MOLDING MACHINE AND METHOD

(75) Inventors: Paul W. Klinedinst, Windsor, PA (US); John M. Mathy, Stewartstown, PA (US); Paul M. Oles, York, PA (US)

(73) Assignee: Graham Engineering Corporation, York, PA (US)

( * ) Notice: Subject to any disclaimer, the term of this patent is extended or adjusted under 35 U.S.C. 154(b) by 512 days.

(21) Appl. No.: 11/564,949

(22) Filed: Nov. 30, 2006

(65) Prior Publication Data

US 2008/0128957 A1  Jun. 5, 2008

(51) Int. Cl.
  B29C 49/36  (2006.01)
  B29C 49/56  (2006.01)
(52) U.S. Cl. .................. 264/523; 425/540; 425/541
(58) Field of Classification Search .......... 425/540, 425/541; 264/523
  See application file for complete search history.

(56) References Cited

U.S. PATENT DOCUMENTS

| | | | |
|---|---|---|---|
| 4,421,472 A | 12/1983 | Martin, Jr. | 425/527 |
| 4,801,260 A | 1/1989 | Oles et al. | 425/527 |
| 4,861,542 A | 8/1989 | Shepps | 264/542 |
| 4,878,828 A | 11/1989 | Wollschlager et al. | 425/541 |
| 5,039,298 A | 8/1991 | Takakusaki et al. | 425/504 |
| 5,229,143 A | 7/1993 | Ogura et al. | 425/532 |
| 5,372,495 A | 12/1994 | Ogura et al. | 425/522 |
| 5,388,981 A | 2/1995 | Scharrenbroich | 425/541 |
| 5,551,862 A | 9/1996 | Allred, Jr. | 425/532 |
| 5,681,596 A | 10/1997 | Mills et al. | 425/532 |
| 5,705,121 A | 1/1998 | Allred, Jr. | 264/543 |
| 5,840,349 A | 11/1998 | Brown, Jr. et al. | |
| 5,948,346 A | 9/1999 | Mills et al. | 264/543 |

OTHER PUBLICATIONS

Graham Engineering Corporation, Clamping Station Assembly M11, Before Oct. 2006, Drawing No. 04148445.

*Primary Examiner*—Robert B Davis
(74) *Attorney, Agent, or Firm*—Hooker & Habib, P.C.

(57) ABSTRACT

A mold clamp assembly for a rotary-type or shuttle-type blow molding machine is mounted on a frame and includes a mold opening and closing drive connected to the two mold halves independently of the frame so that when the mold halves are closed, clamp forces are not transmitted to the mold halves through the frame.

22 Claims, 5 Drawing Sheets

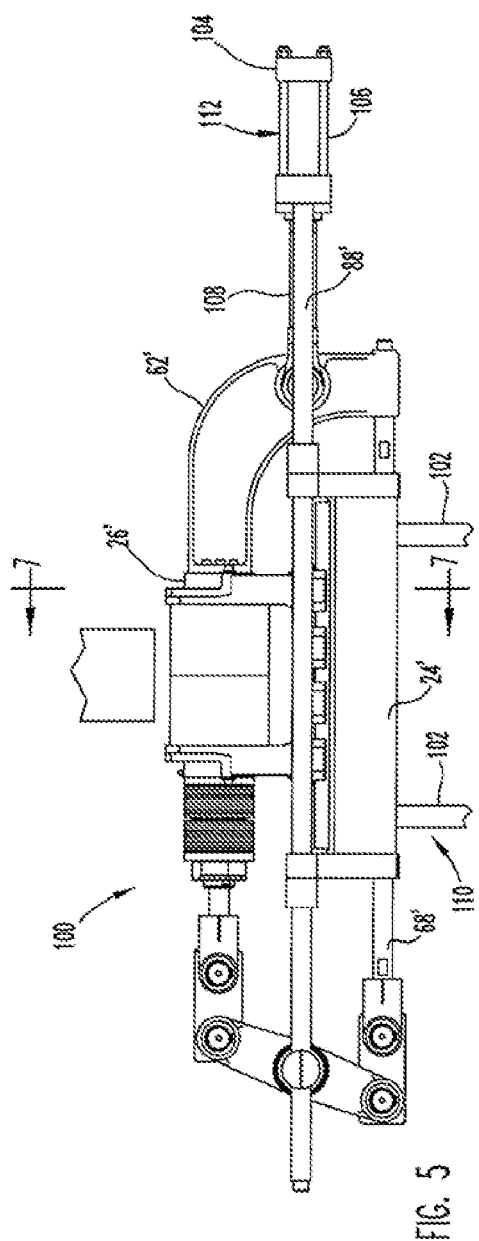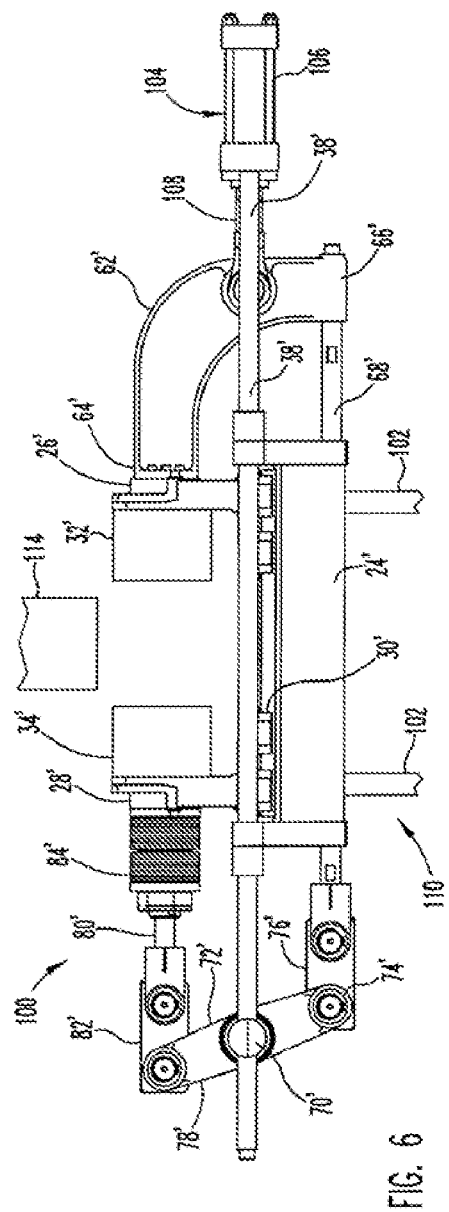

MOLD CLAMP ASSEMBLY FOR BLOW MOLDING MACHINE AND METHOD

FIELD OF THE INVENTION

The invention relates to mold clamp assemblies for blow molding machines and to related methods.

DESCRIPTION OF THE PRIOR ART

In blow molding machines, two mold halves are clamped over one or more parisons prior to blowing of the parisons to form plastic containers. High clamp forces are required to close the mold halves on the parisons to pinch off the plastic and to hold the mold halves closed during blow molding.

Conventional mold clamp assemblies for rotary-type blow molding machines and for shuttle-type blow molding machines are mounted on the frame of the machine supporting the assembly and, when actuated, transmit clamping force from a drive on one side of the mold to the other side of the mold through the frame. This means that the frame supporting the molds must be sufficiently strong to counteract bending moments imposed by the high clamp force transmitted through the frame. Deformation of the frame by the clamp force is impermissible because deformation would not permit the mold faces to close parallel with one another.

Transmission of clamp force from one side of the mold through the frame to the other side of the mold without bending requires heavy, strong frame members, increasing the weight and cost of the machine, the size of the drives necessary to operate the blow molding machine and the cost of operating the machine.

Accordingly, there is a need for an improved mold clamp assembly and method for rotary-type and shuttle-type blow molding machines in which the high clamp force required to hold the mold halves together during blow molding is not transmitted from one side of the mold to the other side of the mold through the machine frame. There is a need to reduce the strength and weight of molding machine frame, the cost of the machine, and the operating cost of the machine.

SUMMARY OF THE INVENTION

The invention is an improved mold clamp assembly and method for rotary-type and shuttle-type blow molding machines. The blow molding machine includes an extendable and retractable drive located to one side of the mold halves. The drive is directly connected to the adjacent mold half and is connected to the remote mold half through a shift rod and a pivot arm mechanism free of the frame. The support for the pivot arm is connected directly to the extendable and retractable drive by a tension member apart from the machine frame. In this way, opposed clamp forces required to hold the mold closed during molding are transmitted directly from the drive to the mold halves. The drive is extended and retracted to open and close the mold halves. Clamp forces are not transmitted through the machine frame and do not subject the frame to bending moments.

As a result, the strength, weight and cost of the frame supporting the mold clamp assembly are reduced and the operating cost of the machine is reduced.

DESCRIPTION OF THE DRAWINGS

FIG. 5 is a side view of a second embodiment mold clamp assembly for a shuttle-type blow molding machine with the mold closed;

FIG. 6 is a view like FIG. 5 with the mold open; and

DESCRIPTION OF THE PREFERRED EMBODIMENTS

Figure 1:
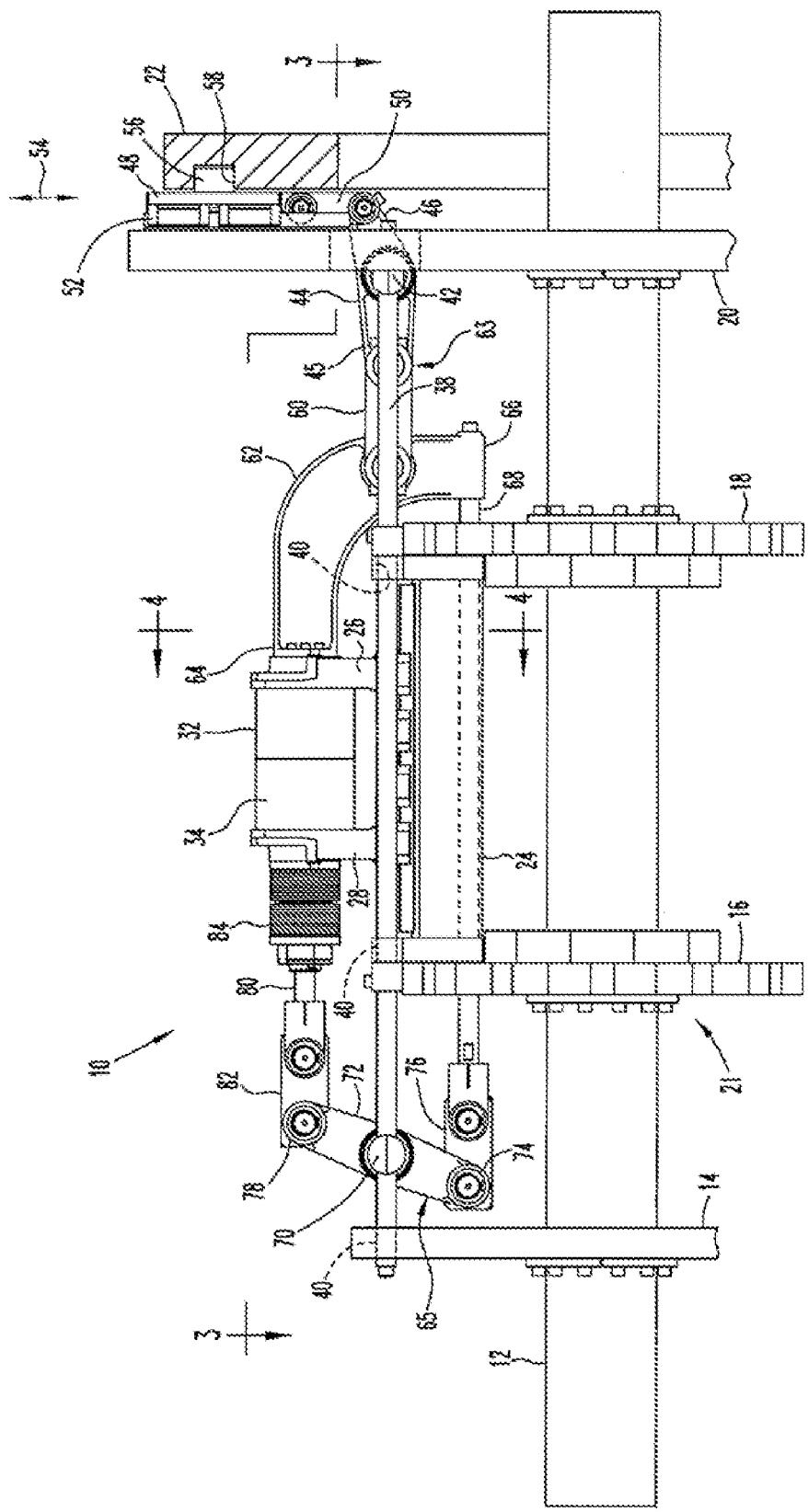
FIG. 1 is a side view of a first embodiment mold clamp assembly for a rotary-type blow molding machine with the mold closed.

A number of first embodiment mold clamp assemblies 10 are mounted around the main shaft 12 of a rotary blow molding machine. The assemblies are supported by plates 14, 16, 18 and 20 extending perpendicularly away from the main shaft and rotate with the main shaft and plates. The shaft and plates form a rotary subframe 21 supporting the assemblies 10. The subframe is rotatably supported by a stationary main frame (not illustrated). The rotary blow molding machine includes a drive on the main frame (not illustrated) for rotating shaft 12 and mold assemblies 10 around the axis of the main shaft between extrusion, blow molding, cooling and ejection stations. A fixed, non-rotating cam ring 22 is mounted on the main frame and engages a cam follower in each assembly 10 for opening and closing the assembly mold, as described below.

The subprime 21 in each assembly 10 includes a base 24 mounted on plates 16 and 18 and extending parallel to the axis of the main shaft 12. Mold platens 26 and 28 are mounted on base 24 by slides 30 which permit movement of the platens toward and away from each other during closing and opening of mold halves 32 and 34 mounted on platens 26 and 28 respectively. FIG. 1 illustrates assembly 10 with the mold halves closed. Assembly 10 includes a pair of tension rods 38 located to either side of and above base 24. The rods extend freely through passages 40 in plate 14 and base 24 and extend above plates 16 and 18.

Pin 42 is located to one side of mold halves 32 and 34 at plate 20. The adjacent ends of tension rods 38 are secured to the pin. Pivot arm 44 is rotatably mounted on pin 42 between the tension rods 38. The outer end 46 of arm 44 away from the mold halves extends through an opening in plate 20 and is connected to slide car 48 by links 50. The slide car is mounted on the side of the plate 20 away from the mold by slide 52 to permit movement of the car back and forth in the direction of arrow 54 shown in FIG. 1. Car 48 carries cam follower roller 56 which extends into circumferential cam slot 58 in fixed ring 22. Rotation of assembly 10 with the main shaft 12 moves follower 56 around slot 58 to shift car 48 inwardly and outwardly and rotate arm 44 between the positions shown in FIGS. 1 and 2 and open and close mold halves 32 and 34.

Shift member 62 is located between mold platen 26 and plate 20. The upper end 64 of member 62 is bolted directly to mold platen 26 so that movement of member 62 toward plate 20 moves the mold half from the closed position of FIG. 1 to the open position of FIG. 2. The lower end 66 of shift member 62 is located below mold halves 32 and 34.

Link 60 is pivotally connected to the inner link end 45 of arm 44 and to mold shift member 62. The pivot connection between link 60 and member 62 is located halfway between the upper end 64 and lower end 66 of member 62 to balance forces. Shift rod 68 is parallel to the axis of main shaft 12 and extends freely through passages in base 24 and plates 16 and 18. The shift rod 68 is connected to the lower end 66 of member 62. The link 60 and inner link end 45 of arm 44 form a two link extendable and retractable drive 63 for opening and closing mold halves 32 and 34.

Cross pin 70 is mounted on the ends of rods 38 extending past mold half 34 and rotatably supports pivot arm 72. The lower end 74 of arm 72 is connected to the adjacent end of shift rod 68 by pivot link 76. The upper end 78 of arm 72 is connected to mold clamp rod 80 by pivot link 82. Clamp rod 80 is connected to platen 28 through dished washer spring pack 84. Rod 68, arm 72 and rods 38 and 80 are part of a mold shift mechanism 65 for opening and closing mold half 34. Mechanism 65 is connected to drive 63 through member 62.

Operation of the first embodiment mold clamp assembly will now be described.

Figure 2:
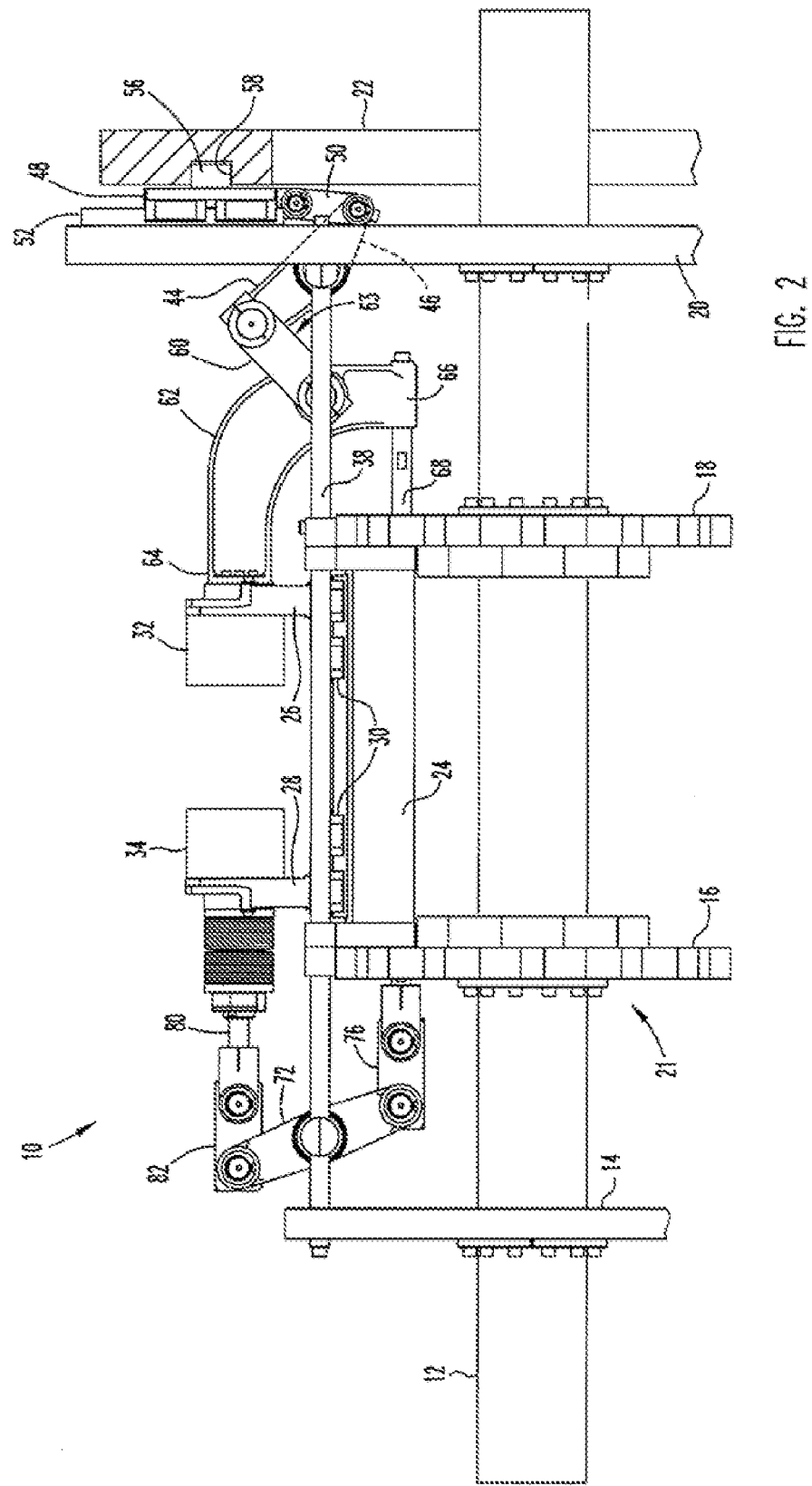
FIG. 2 is a view like FIG. 1 with the mold open.
Figure 3:
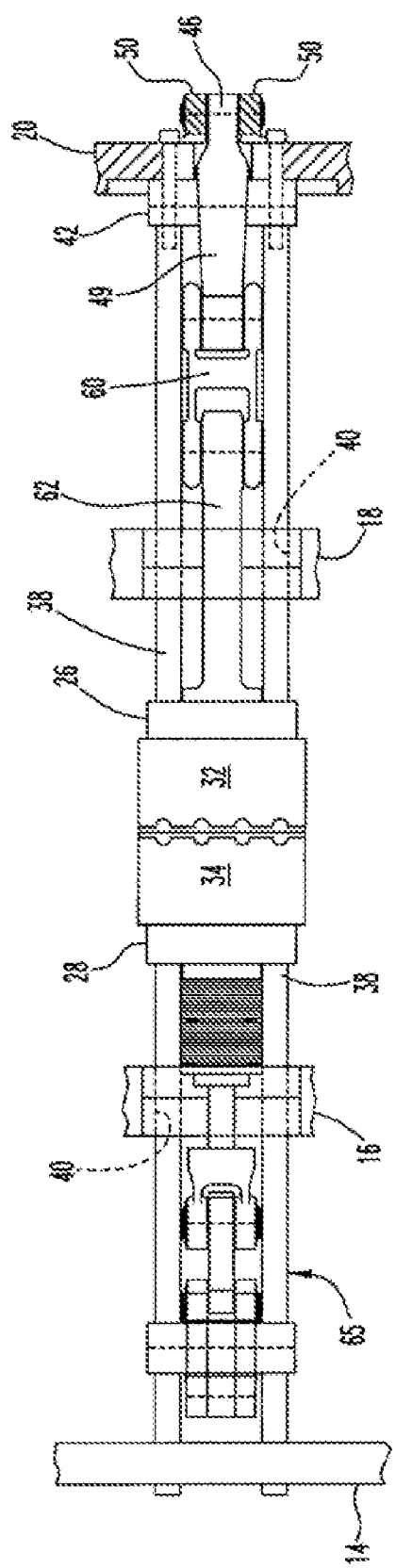
FIG. 3 is a view taken generally along line 3-33 of FIG. 1.

With the mold halves 32 and 34 in the open position and drive 63 retracted as shown in FIG. 2, rotation of shaft 12 moves the open mold halves past the extrusion station to either side of a number of parisons extruded from an extrusion head. Rotation of the assembly 10 also moves follower 56 along a radially outward portion of slot 58 to shift car 48 radially outwardly from the position of FIG. 2 to the position of FIG. 1. This movement rotates arm 44 counterclockwise from the position of FIG. 2 to the position of FIG. 1.

Rotation of arm 44 from the position of FIG. 2 to the position of FIG. 1 extends drive 63 to move shift member 62 away from plate 20 and toward base 24. Movement of the shift member moves mold half 32 from the open position to the close position. Movement of the shift member also actuates mold shift mechanism 65 to move shift rod 68 away from plate 20, rotate arm 72 and move mold half 34 from the open position to the closed position. The connection between rod 80 and spring pack 84 is adjusted so that spring pack 84 is compressed when the mold is closed.

During and after closing of the mold, the clamp force exerted on mold half 34 is transmitted directly to drive 63 through mechanism 65. An equal and oppositely directed clamp force exerted on mold half 32 is transmitted to the drive directly through member 62. Clamping forces are not transmitted through frame 21. The end of the mechanism 65 adjacent plate 14 floats on frame 21. As a result, the frame is not subjected to bending moments by the high clamp forces holding molds 32 and 34 closed. The frame need not be strengthened against bending moments. Smaller, more efficient motors may be used to operate the machine.

After closing of the mold to capture the parison, rotation of shaft 12 moves the closed mold halves away from extrusion station to a blow station where the parisons are blown, and, after cooling of the blown parisons, to an ejection station where the mold is opened for ejection of blow molded containers. During rotation to the ejection station, follower 56 is moved radially inwardly by track 58 so that arm end 46 is moved radially inwardly, drive 63 is retracted as shown in FIG. 2, and the mold halves are opened by movement of the shift member 62 and mechanism 65. Mold half 32 is connected directly to shift member 62 and is opened in response to movement of the member. Mold half 34 is opened by movement of shift rod 68 toward plate 20, corresponding rotation of arm 72 and movement of rod 80 away from plate 20.

Figure 7:
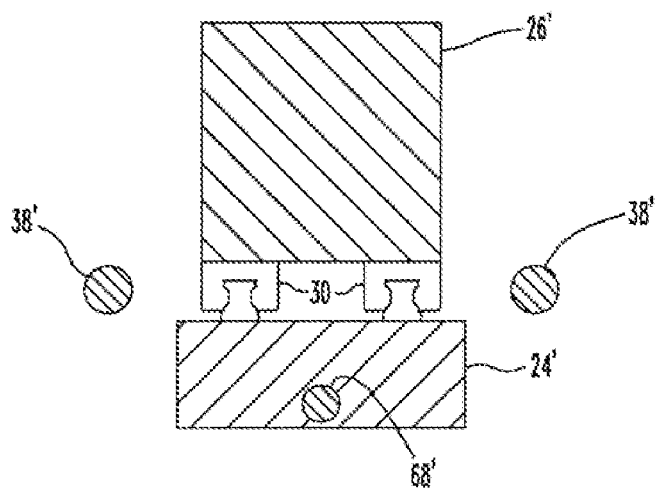
FIG. 7 is a sectional view taken along line 7-7 of FIG. 5.
Figure 4:
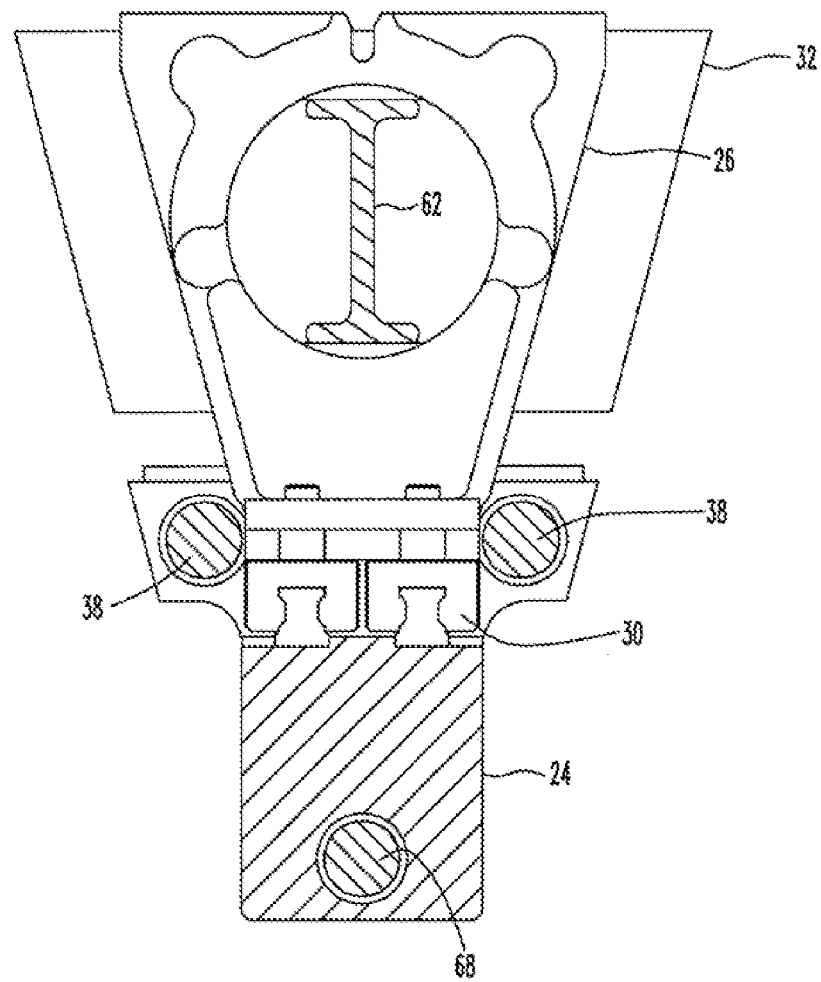
FIG. 4 is a sectional view taken along line 4-4 of FIG. 1.

Second embodiment mold clamp assembly 100 illustrated in FIGS. 5, 6 and 7 is used in a shuttle-type blow molding machine. The second embodiment assembly 100 includes components identical to the components of the first embodiment assembly 10. These components are identified in FIGS. 5, 6 and 7 using the same reference numbers used in FIGS. 1-4 to describe components of the first embodiment assembly, with the exception that elements of the second assembly are identified by addition of a prime symbol (') after the number.

In assembly 100, base 24' is mounted on support members 102 of frame 110 of a shuttle-type blow molding machine. The frame is shiftable in a direction perpendicular to the views of FIGS. 5 and 6 to move assembly 100 away from an extrusion station as illustrated, where mold halves 32' and 34' are located below extrusion head 114, to a remote ejection station. The drive for shifting frame 110 and assembly 100 on the frame between the extrusion and ejection stations is conventional.

Assembly 100 includes a force operator 104, which may be a hydraulic or pneumatic cylinder or an electric linear actuator, for moving the mold halves 32' and 34' between the open and closed positions. Operator 104 includes a first body member 106 located outwardly of shift member 62' and connected to the two tension rods 38', and a second body member 108 connected to shift member 62' midway between the upper and lower ends 64' and 66'. Extension of operator 104 moves member 108 away from member 106 to move the shift member 62' toward base 24' and move the mold halves 32' and 34' from the open position of FIG. 6 to the closed position of FIG. 5. The mold shift mechanism 65' for assembly 100 is identical to mechanism 65.

Retraction of operator 104 moves member 108 toward member 106 to move the mold halves from the closed position to the open position. Operator 104 is a two ended extendable and retractable drive 112 for assembly 100.

Opening and closing of the mold halves by the second embodiment mold clamp assembly is performed without transmitting clamp forces through frame 110 and subjecting the frame to bending moments. The tension rods 38' and shift rod 68' transmit clamp force from drive 112 directly to mold half 34' without transmission of forces through the frame. Mold clamp force is transmitted directly from drive 112 to mold half 32'.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

We claim:

1. A mold clamp assembly for a blow molding machine, the assembly comprising: a frame; first and second mold halves on the frame; a slide member connecting said mold halves to said frame to permit movement of the mold halves toward and away from each other; an extendable and retractable drive having opposed drive ends, said drive located adjacent the first mold half; a shift member attached to one end of the drive and to said first mold half; a shift rod attached to said shift member and extending past the mold halves; a first tension member attached to the other end of the drive, said tension member extending past the mold halves; a pivot arm mounted on the tension member adjacent the second mold half, the pivot arm having a first end connected to the shift rod, a second end connected to the second mold half and a pivot connected to the tension member; said shift member, said shift rod, and said tension member being movable relative to the frame without transmitting forces to the frame; wherein actuation of said drive closes the mold halves without transmitting clamp forces through the frame.

2. The mold clamp assembly as in claim 1 wherein the extendable and retractable drive comprises two pivot links.

3. The mold clamp assembly as in claim 1 wherein the extendable and retractable drive comprises a pressure cylinder.

4. The mold clamp assembly as in claim 1 wherein the extendable and retractable drive comprises a linear actuator.

5. The mold clamp assembly as in claim 1 including a second tension member, said arm located between said tension members.

6. The mold clamp assembly as in claim 1 including a rotary main shaft for a rotary blow molding machine, said frame mounted on said shaft.

7. The mold clamp assembly as in claim 1 wherein said frame is part of a shuttle-type blow molding machine.

8. A mold clamp assembly for a blow molding machine comprising: a frame; first and second mold halves on the frame; a drive located adjacent the first mold half; a shift member connected between the first mold half and the drive free of the frame; a shift mechanism connected between the second mold half and the drive free of the frame, the mechanism extending past the mold halves; the drive having a first position in which the mold halves are held in a closed position by the shift member and the mechanism and a second position in which the mold halves are held in an open position by the shift member and the mechanism, said shift member and shift mechanism movable relative to the frame without transmitting forces to the frame; wherein opposed clamp forces holding the mold halves closed when the drive is in the first position are transmitted directly from the drive to the mold halves through the member and the mechanism without transmission through the frame.

9. The clamp assembly of claim 8 wherein the drive comprises a pair of pivot links.

10. The mold clamp assembly of claim 8 wherein the drive comprises a pressure cylinder.

11. The mold clamp assembly of claim 8 wherein the drive comprises a linear actuator.

12. The mold clamp assembly of claim 8 wherein extension of the drive closes the mold halves.

13. The mold clamp assembly of claim 8 wherein the shift member and the mechanism comprise a common element.

14. The mold clamp assembly of claim 8 wherein the mechanism includes a pivot arm adjacent the second mold half; the arm having a pivot, a first pivot arm end connected to the second mold half and a second pivot arm end; a shift member free of the frame, the shift member extending past the mold halves and connected to the second pivot arm end and to the drive; and a tension member extending past the mold halves free of the frame, the tension member connected to the pivot for the pivot arm and to the drive, the drive located between A) the tension member and B) the shift member, wherein operation of the drive moves the first mold half and the second mold half together.

15. The mold clamp assembly as in claim 8 wherein said frame includes a base, said mold halves movably mounted on the base; and said mechanism extends freely through the base.

16. The mold clamp assembly as in claim 8 wherein said mechanism comprises two tension members.

17. A method of opening and closing mold halves in a blow molding machine of the type having a frame, first and second mold halves mounted on the frame and movable between open and closed positions, a drive, and connections between the drive and the mold halves, comprising the steps of:
A. moving the drive from a first position to a second position to move the mold halves to the open position; and
B. moving the drive from the second position to the first position to close the mold halves and exert a clamp force sufficient to hold the mold halves on a parison and hold the mold halves closed during blow molding by transmitting opposed clamp forces from the drive to the mold halves without transmitting clamp forces through the frame.

18. The method of claim 17 including the step of:
C. moving the drive from a retracted position to an extended position to close the mold halves.

19. The method of claim 17 including the step of:
D. transmitting a clamp force to a first mold half through a pivot arm located adjacent the such mold half free of the frame.

20. The method of claim 19 including the step of:
E. transmitting the clamp force to the said first mold half through a member located under the mold halves free of the frame.

21. The method of claim 17 including the step of:
F. transmitting a clamp force for both mold halves through members connected to both said mold halves free of the frame.

22. mold clamp assembly as in claim 8 wherein said drive includes two extendable and retractable members, one member connected to the shift member, and the other member connected to the tension member.

* * * * *

UNITED STATES PATENT AND TRADEMARK OFFICE
CERTIFICATE OF CORRECTION

PATENT NO.        : 7,611,657 B2
APPLICATION NO. : 11/564949
DATED             : November 3, 2009
INVENTOR(S)       : Paul W. Klinedinst, John M. Mathy and Paul M. Oles It is certified that error appears in the above-identified patent and that said Letters Patent is hereby corrected as shown below:

Column 2, Line 29, replace "subprime" with --subframe--.
Column 6, Line 39 (claim 22), before "mold" insert --The--.

Signed and Sealed this

Eighth Day of December, 2009

David J. Kappos
*Director of the United States Patent and Trademark Office*